United States Patent [19]

Howell

[11] 3,941,010
[45] Mar. 2, 1976

[54] SAFETY RELEASE HANDLE APPARATUS
[75] Inventor: LeRoy H. Howell, Filer, Idaho
[73] Assignee: Stratford Squire International, Magic Mill, Salt Lake City, Utah
[22] Filed: Sept. 16, 1974
[21] Appl. No.: 506,316

[52] U.S. Cl. .................... 74/545; 74/548; 74/550; 81/90 B; 241/248; 403/17
[51] Int. Cl.² ......................................... G05G 1/12
[58] Field of Search ............ 74/545, 548, 550, 557; 81/90 B; 241/248; 403/17, 19

[56] References Cited
UNITED STATES PATENTS

| 986,796 | 3/1911 | Behm | 74/557 X |
|---|---|---|---|
| 1,245,917 | 11/1917 | Hewitt | 74/557 X |
| 1,467,016 | 9/1923 | Tesoro | 74/550 |
| 1,547,921 | 7/1925 | Hunt | 74/550 |
| 3,230,783 | 1/1966 | Anderson | 74/557 X |

*Primary Examiner*—Samuel Scott
*Assistant Examiner*—F. D. Shoemaker
*Attorney, Agent, or Firm*—Hubbard, Thurman, Turner & Tucker

[57] ABSTRACT

A safety handle is provided for manually rotating a motor shaft for a stone grinding mill. One end of the handle is curved to encompass a portion of the shaft periphery. A hook at the end of the curved portion fits into the keyway of the shaft. The handle arm extends radially from the shaft with a hand grip at the end opposite the curved portion. When torque is applied to the handle in the direction of normal motor rotation, the curved portion and hook grip the shaft by rotational leverage and transmit the torque to the shaft. If the motor is inadvertently started with the handle on the shaft, inertia and gravity will cause the handle to disengage and roll off from the shaft to prevent damage and injury. The hand grip is attached to the handle so as to allow only manual rotation of the shaft in the normal motor direction. Alternately, the handle is bent transverse to its longitudinal axis to extend outward from the motor and thus enable rotation only when mounted properly on the shaft.

15 Claims, 5 Drawing Figures

U.S. Patent   March 2, 1976   3,941,010
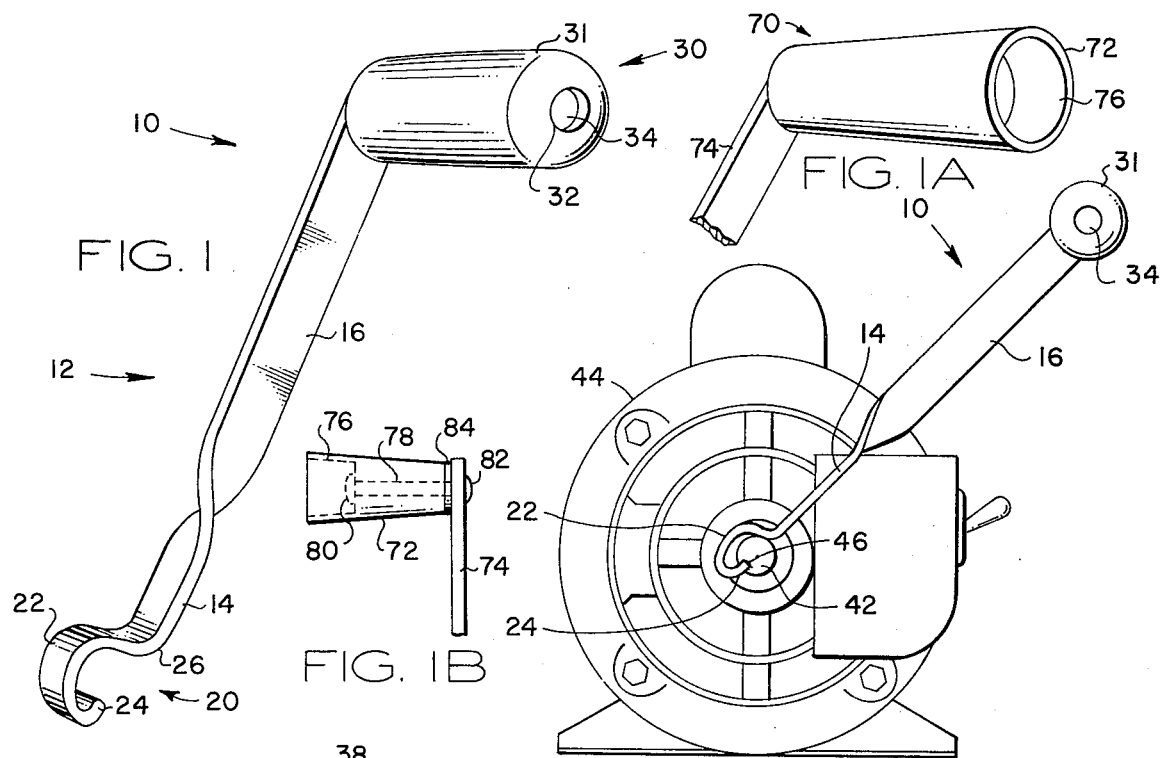
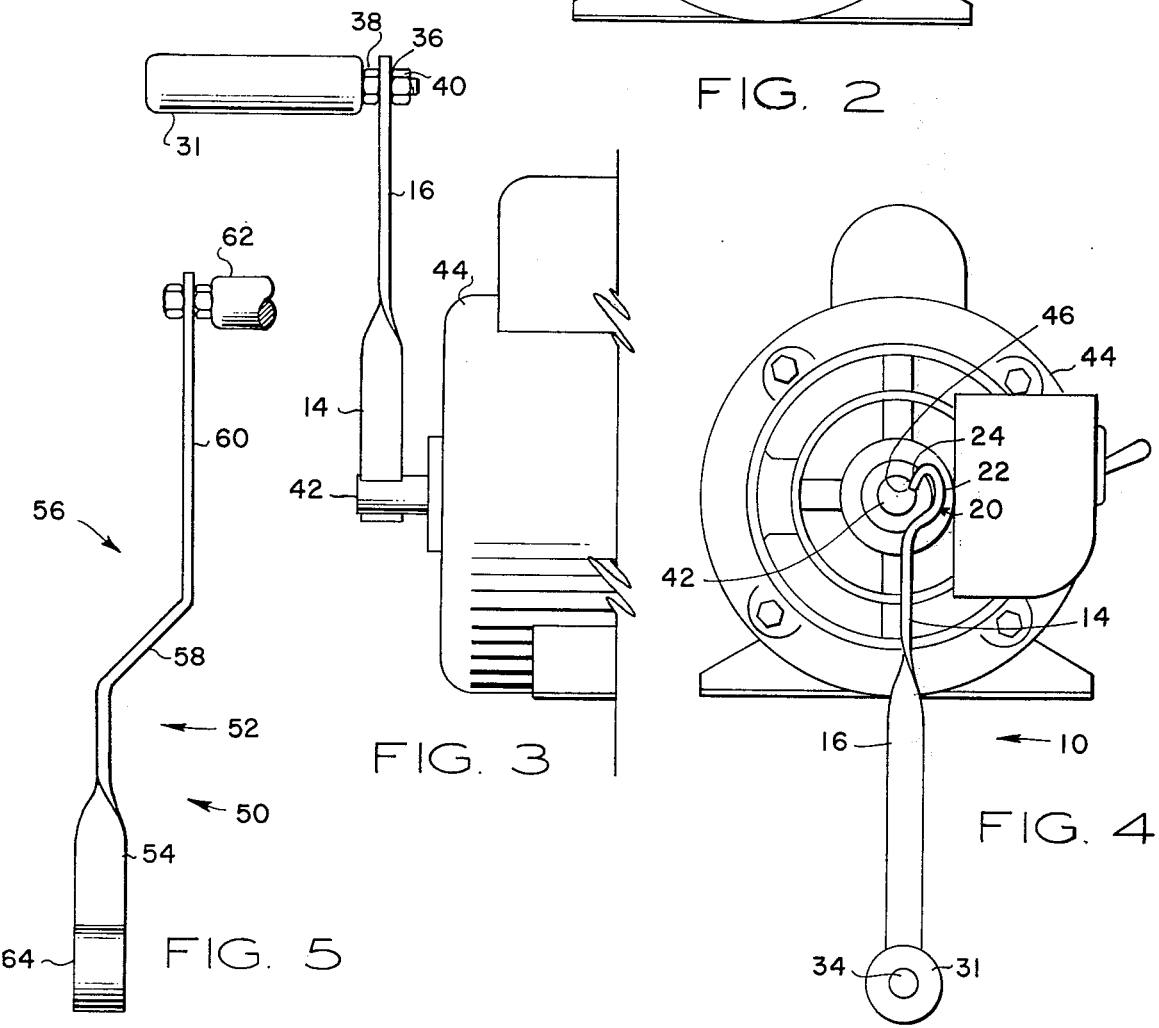

SAFETY RELEASE HANDLE APPARATUS

BACKGROUND AND SUMMARY OF THE INVENTION

This invention relates generally to handle apparatus and more particularly to a safety release handle for rotating a motor shaft on a stone grinding mill.

Small grinding mills for home use in grinding grains, rice and other kernel foods are becoming increasingly common. Some of the simpler mills are manually driven while other mills utilize an electric motor to drive the grinding stones. A motor is preferable because of the high rotational speeds needed for rapid grinding. However, motor driven mills are dependent upon an energy source and are useless in the event of a power failure.

In some instances, a handle has been provided to turn the shaft of a motor driven mill for manual operation. The handle must be mounted to grip the shaft tightly in order to impart torque to the shaft. If for some reason the handle is inadvertently left on the shaft when the motor is started, the handle is rapidly rotated with the shaft presenting a dangerous hazard for anyone nearby. In addition, the spinning handle may separate from the shaft causing damage to property and injury to the operator or bystanders.

The present invention is directed to a safety handle for manually turning the motor shaft of a stone grinding mill. One end of the handle connects to the shaft so as to grip the shaft tightly as torque is imparted in the direction of motor rotation. If the handle is rotated in the opposite direction, it automatically disengages from the shaft. Should the motor shaft begin to turn independent of handle operation, inertia and gravity will act upon the handle to effectively rotate the handle relative to the shaft opposite to the direction of normal motor rotation. Thus, the handle automatically disengages and falls from the shaft in the event of inadvertent motor start-up.

In accordance with one aspect of the invention, handle apparatus is provided for manually rotating a motor shaft in a predetermined direction. Grip means engage the shaft to apply rotational torque by a lever arm connected to the grip means. The grip means automatically releases the shaft when the shaft rotates independently in the predetermined direction. The lever is adapted to allow rotation with the shaft only when the grip means is engaged with the shaft for rotation in the predetermined direction.

In accordance with another aspect of the present invention, a handle apparatus is provided for manually rotating a motor shaft having an aperture therein. The handle includes a mechanism for gripping the shaft with a curved portion adapted to contact the periphery of the shaft and a projecting portion adapted for inserting into the aperture. The curved portion and the projecting portion engage the shaft when rotational torque is applied to the gripping mechanism in the first direction and disengage the shaft when rotational torque is applied to the gripping mechanism in a second direction. A lever integral with the gripping mechanism projects radially outward from the shaft for applying torque to the mechanism.

In accordance with yet another aspect of the present invention, an automatic release handle is provided for a grinding mill having an electric motor with a shaft projecting from the rear of the motor. A curved member engages a portion of the circumference of the shaft. A hook projects from one end of the curved member into a keyway in the shaft. A lever arm integral with the other end of the curved member extends radially from the shaft. The handle grips the shaft to impart torque to the shaft in the direction of normal motor rotation and disengages from the shaft upon independent rotation of the shaft in that direction.

DESCRIPTION OF THE DRAWINGS

A more complete understanding of the invention may be had by referring to the following detailed description when taken in conjunction with the accompanying drawings, wherein:

FIG. 1 is a perspective view of the safety release handle apparatus of the present invention;

FIG. 1A is a partial perspective view of an alternate embodiment of the safety release handle apparatus of the present invention;

FIG. 1B is a partial side view of the safety release handle of FIG. 1A;

FIG. 2 is a front view of the handle apparatus of FIG. 1 mounted on a motor shaft;

FIG. 3 is a side view of the handle apparatus of FIG. 2;

FIG. 4 is a front view of the handle apparatus of FIG. 2 with the motor shaft in independent rotation; and FIG. 5 is a side elevation view of an alternate embodiment of the handle apparatus of the present invention.

DETAILED DESCRIPTION OF THE PREFERRED EMBODIMENT

With reference to FIG. 1, a safety handle 10 is shown for use in manually rotating a motor shaft. Handle 10 is comprised of a flat elongated metal lever arm 12 which has been twisted along its longitudinal axis to form a short portion 14 and a long portion 16. Long portion 16 is oriented at approximately a 90° twist with respect to short portion 14. A gripping member 20 is provided integral with one end of short portion 14 of lever arm 12. Gripping member 20 is formed by a bent portion 26 extending at a right angle from short portion 14. A curved portion 22 continues from the bent portion 26 to form an arc ending in a hooked portion 24 integral with curved portion 22 at the end remote from upper portion 14 of lever arm 12. Hooked portion 24 projects radially inward with respect to curved portion 22 in a plane parallel to the longitudinal axis of lever arm 12 and extends approximately one third of the distance toward bent portion 26.

A hand grip 30 is connected to the end of lever arm 12 remote from gripping member 20. Hand grip 30 is comprised of a cylindrical-shaped wooden piece 31 having a hollow concentric shaft 32 extending longitudinally therethrough. A threaded bolt 34 is inserted into one end of bore 32 and extends from the other end through an aperture 36 in the end of lever arm 12. Nuts 38 and 40 are screwed onto bolt 34 on either side of lever arm 12 to secure hand grip 30 tightly in place.

Another preferred embodiment of the safety handle is shown in FIGS. 1A and 1B. A hand grip 70 includes a truncated cone-shaped gripping piece 72 connected to a lever arm 74 substantially identical to lever arm 12. Gripping piece 72 is preferably a molded phenolic or plastic composition handle. Gripping piece 72 includes a hollowed cylindrical well 76 in the larger end of piece 72 and a bore 78 through the center of the remaining portion of piece 72. A solid metal shank 80 is inserted through bore 78 and attached to lever arm 74 at point 82 by swaging or welding. A washer 84 is placed between gripping piece 72 and lever arm 74 to provide a bearing surface to facilitate rotation of handle 70.

With reference now to FIGS. 2 and 3, safety handle 10 is shown mounted on a shaft 42 extending from the rear of an electric motor 44. Motor 44 is of the type normally used in rotating a movable grinding stone against a stationary stone to grind grain, rice and other kernel foods. Shaft 42 is a "floating" shaft which extends through motor 44 and out the rear end for rotating by safety handle 10. A keyway slot 46 extends longitudinally along shaft 42 for the insertion of a key to lock shaft 42 into place.

As best seen in FIG. 2, safety handle 10 is mounted on shaft 42 for manual rotation of the shaft. Hooked portion 24 is less wide than keyway slot 46 for insertion into the slot. Curved portion 22 has a radius of curvature slightly greater than the radius of shaft 42 so that it can fit around a portion of the periphery of the shaft. In the position shown in FIGS. 2 and 3, the force of gravity on safety handle 10 and lever arm 12 acts through gripping member 20 to hold safety handle 10 in place on shaft 42. Specifically, hooked portion 24 cooperates with curved portion 22 and bend portion 26 to provide rotational leverage against shaft 42. Gripping member 20 is formed to cover about half the periphery of shaft 42 so that handle 10 will remain on the shaft in more than half of the rotational positions of the handle.

In operation, safety handle 10 is rotated clockwise in the direction of normal motor rotation. Gripping member 20 provides rotational leverage as previously mentioned to grasp shaft 42 tightly as the handle is turned. If safety handle 10 is rotated in a counterclockwise manner, as shown in FIG. 4, the curved portion 22 of gripping member 20 will roll off of shaft 42 and the hooked portion 24 disengages keyway slot 46. Handle 10 thus cannot be used to rotate shaft 42 in a counterclockwise direction since it becomes entirely disengaged from the shaft when torque in that direction is applied.

If motor 44 is started while safety handle 10 is still on shaft 42, the same action shown in FIG. 4 will result. Inertia and gravity acting upon handle 10 will tend to hold handle 10 back while shaft 42 begins to rotate. Thus, the action of handle 10 relative to shaft 42 is essentially the same as if handle 10 were rotated counterclockwise. As shaft 42 begins to spin, curved portion 22 rolls off of shaft 32 and safety handle 10 disengages and falls away from the shaft. If motor 44 is started with handle 10 in the position shown in FIGS. 2 and 3, the handle will tend to follow the shaft because of gravity. However, inertia will slow the handle rotation and cause gripping member 20 to roll off shaft 42. In any position, handle 10 will not be accelerated by the rotating shaft but will simply fall to the ground.

Hand grip 30 is attached to lever arm 12 to project outward away from motor 44 when gripping member 20 is mounted on shaft 42 for clockwise rotation. In the event that handle 10 is improperly mounted on shaft 42 for counterclockwise rotation, hand grip 30 projects inward to prevent manual rotation of handle 10. Thus, handle 10 would only be mounted on shaft 42 for clockwise rotation of the shaft so that automatic release of the handle in the event of inadvertent motor start-up is assured.

An alternate embodiment of the present invention comprising a modified safety handle 50 is shown in FIG. 5. A lever arm 52 is provided similar to lever arm 12 having a short portion 54 and a long portion 56 twisted 90° relative to each other. In addition, lever arm 52 is bent outward to project the lower portion of the arm away from the motor. As shown in FIG. 5, long portion 56 includes a first bent portion 58 projecting transverse to the longitudinal axis of lever arm 52 at approximately 45°. A second bent portion 60 extends at about 45° relative to the first bent portion 58 in a plane parallel to short portion 54. A hand grip 62 essentially the same as hand grip 30, extends from the lower end of the second portion 60. Likewise, a gripping member 64, similar to gripping member 20, is integral with the upper end of short portion 54.

First and second bent portions 58 and 60 cause the lower portion of lever arm 52 to jut outward away from motor 44. This shape assures that safety handle 50 will not be improperly mounted on shaft 42 for counterclockwise direction, since the lever arm would normally be blocked by the table supporting motor 44. Moreover, modified lever arm 52 assures that hand grip 62 will be properly assembled on lever arm 54. If, for any reason, hand grip 62 is assembled on the wrong side of lever arm 52, manual rotation of the motor shaft would be prevented. Lever arm 52 would project inward against the table supporting motor 44 to prevent mounting gripping member 64 on the motor shaft or rotating handle 50.

From the foregoing discussion it is understood that the present invention includes new and useful features with regard to a safety release handle apparatus. The handle of the present invention provides a simple and easy way of removeably mounting a handle to a motor shaft for firmly gripping the shaft to impart torque. Moreover, the handle of the present invention may be mounted directly on a motor shaft utilizing the shaft keyway. The handle is mounted for continuous rotation by an operator behind the motor. The gripping mechanism allows the handle to be left on the shaft in a variety of positions for further manual rotation. If the motor is accidentally started, the handle will fall harmlessly beneath the motor shaft without causing damage or injury. The hand grip is connected so that the handle may be mounted on the motor shaft for rotation only in the direction of normal motor rotation. An alternate preferred embodiment of the present invention includes a bent lever arm to further insure safe use of the present invention.

Although particular embodiments of the invention have been illustrated in the accompanying drawings and described in the foregoing detailed description, it will be understood that the invention is not limited to the embodiments disclosed. For example, the handle of the present invention may be combined with a gear mechanism for increasing the rotational speed of the motor shaft. Other rearrangements, modifications and substitutions may be made without departing from the spirit of the invention.

What is claimed is:

1. Handle apparatus for manually rotating a motor shaft in a predetermined direction comprising:
    grip means for engaging said shaft to apply rotational torque in said predetermined direction to said shaft and for releasing said shaft when said shaft rotates independently in said predetermined direction, and lever means connected to said grip means for applying torque to said grip means in said predetermined direction, said lever means being adapted for rotation with said shaft only when said grip means engages said shaft for rotation in said predetermined direction, said grip means comprising curved means for engaging a portion of the periphery of said shaft, and hook means associated with said curved means for engaging a keyway in said shaft, said curved means and said hook means cooperating to engage said shaft as torque is applied to said grip means in said predetermined direction and to disengage said shaft as said shaft independently rotates in said predetermined direction.

2. The apparatus of claim 1 wherein said lever means comprises handle means connected to the end of said lever means opposite said grip means for turning said lever means in said predetermined direction.

3. The apparatus of claim 1 wherein said lever means comprises a flat lever arm having an upper portion integral with said grip means and extending radially from said shaft, and a lower portion integral with the upper portion and twisted approximately 90° with respect to the upper portion about the longitudinal axis of said lever arm.

4. The apparatus of claim 3 wherein said lever means further comprises a handle attached to the end of the lower portion of the lever arm remote from the upper portion, said handle extending normal to said lever arm away from said motor when said grip means engages said shaft for rotation in said predetermined direction thereby enabling manual rotation of said shaft.

5. The apparatus of claim 1 wherein said lever means comprises a lever arm integral with said grip means and extending radially from said shaft, said lever arm being bent transverse to its longitudinal axis to extend outward away from said motor when said grip means is engaged with said shaft for rotation in said predetermined direction.

6. Handle apparatus for manually rotating a motor shaft having an aperture therein, comprising:

means for gripping said shaft including a curved portion adapted to encircle a portion of the periphery of said shaft and a projecting portion adapted for inserting into said aperture, said curved portion and said projecting portion engaging said shaft when rotational torque in a first direction is applied to said gripping means and disengaging said shaft when rotational torque in a second direction is applied to said gripping means, and lever means attached to said gripping means projecting radially outward from said shaft for applying torque to said gripping means to rotate said shaft through multiple rotations in said first direction with said gripping means in continuous engagement with said shaft.

7. The apparatus of claim 6 and further comprising a handle attached to one end of said lever means for rotating said lever means and said handle with said shaft, said handle extending normal to the longitudinal axis of said lever means whereby said handle may be manually rotated with said shaft only when said gripping means engages said shaft for rotation in the first direction.

8. The apparatus of claim 6 wherein said lever means is adapted to allow engagement of said gripping means to said shaft only if said gripping means engages said shaft for rotation in said first direction.

9. The apparatus of claim 8 wherein said lever means comprises a lever arm extending radially from said shaft and a handle attached to said lever arm projecting normal from one side of said arm to allow manual rotation of said shaft only when said gripping means engages said shaft for rotation in said first direction.

10. The apparatus of claim 8 wherein said lever means comprises a lever arm bent transverse to its longitudinal axis to extend outward away from said motor when said gripping means engages said shaft for rotation in said first direction and to extend inward toward said motor when said gripping means engages said shaft for rotation in said second direction, thereby preventing sustained manual rotation of said shaft in said second direction.

11. The apparatus of claim 10 wherein said lever arm is bent twice to form a first portion extending radially outward from said shaft, a second portion projecting at an angle away from said shaft and a third portion extending further from the shaft in a plane parallel with the plane of the first portion.

12. The apparatus of claim 6 wherein said curved portion is adapted to encircle approximately half of the periphery of the shaft whereby said gripping means will maintain engagement with said shaft in substantially half of the possible shaft positions when said shaft is not rotating.

13. In a stone grinding mill having an electric motor with a shaft projecting through the rear of said motor for manual rotation of said shaft in the direction of normal motor rotation, an automatic release handle comprising:

a curved member for engaging a portion of the circumference of the shaft, a hook projecting from one end of the curved member into a keyway in said shaft, and a lever arm integral with the other end of said curved member extending radially from said shaft, whereby said handle will grip said shaft to impart torque to said shaft in said direction and will disengage from said shaft upon independent rotation of said shaft in said direction.

14. The handle of claim 13 and further comprising an end member extending normal from said lever arm to allow manual rotation of said shaft by said handle only in said direction.

15. The handle of claim 13 wherein said curved member has a radius of curvature slightly greater than the radius of curvature of said shaft.

* * * * *